United States Patent Office 3,043,923
Patented July 10, 1962

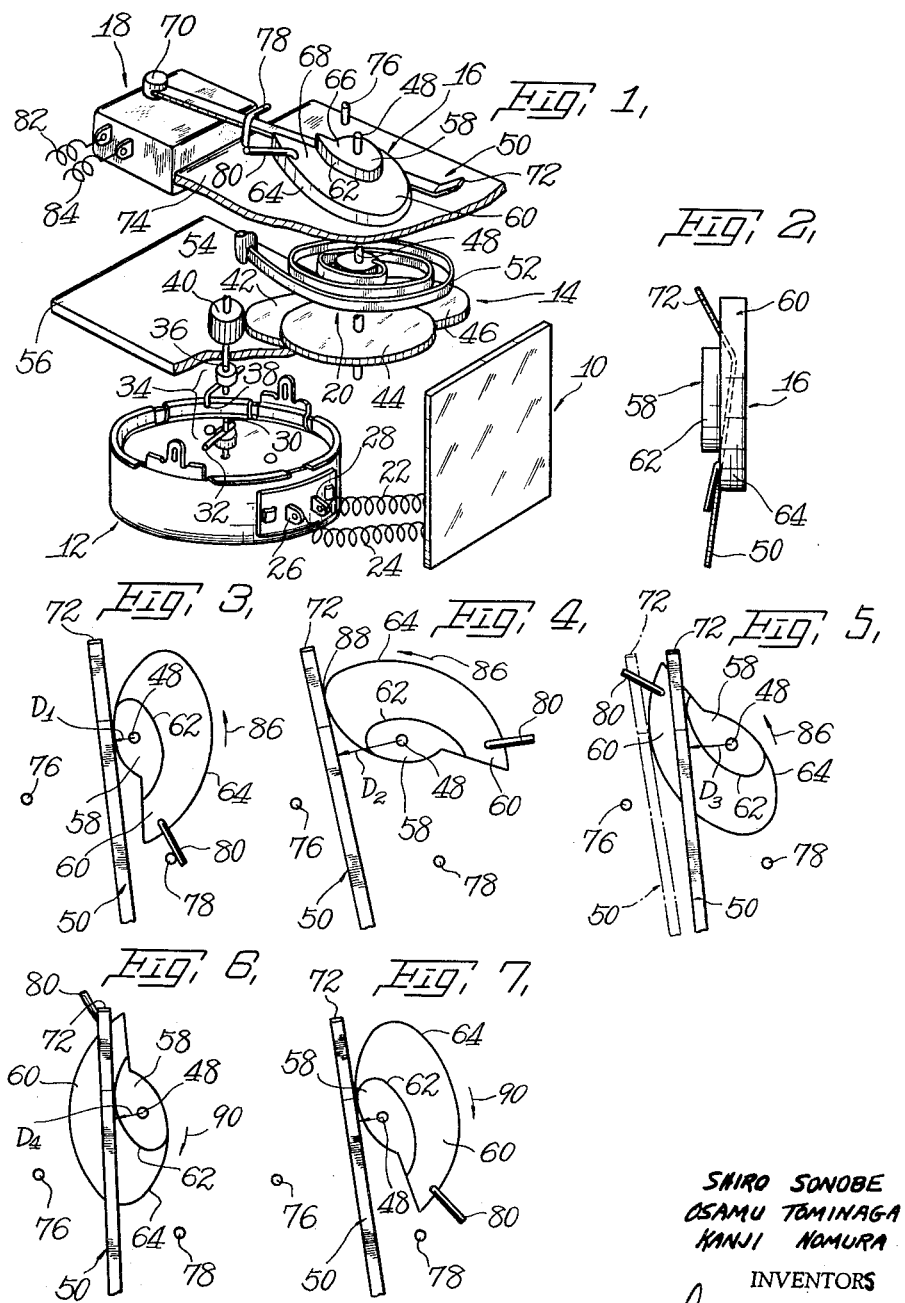

3,043,923
SOLAR SWITCH
Shiro Sonobe, Osamu Tominaga, and Kanji Nomura, Tokyo, Japan, assignors to Nihon Denki Tokei Co., Ltd., Tokyo, Japan
Filed May 7, 1959, Ser. No. 811,729
7 Claims. (Cl. 200—38)

This invention relates to devices responsive to radiated energy and to controls actuatable thereby. More particularly, the invention relates to automatic switches controlled by intermittently available signals of low magnitude energy.

An important object of the invention is to provide an improved device which responds to radiated energy such as, for example, sun light to perform a function such as, for example, operating a switch.

The operation of a switch by a light responsive device is not per se a novel concept. However, known systems for performing this function have contemplated the use of vacuum tubes and other analogous components which are expensive and susceptible to failure and which do not have an optimum reliability.

Accordingly, it is an object of the invention to provide an improved device of the above-indicated type which is economical while having optimum longevity and substantially constant characteristics over extended periods of operation.

In its preferred form, the invention provides for operation in response to visible light (e.g. sunlight). The invention, however, may find use in connection with other radiated energy such as infra-red, X-ray, thermal and other types of radiation.

In this regard, it is an object of the invention to provide control apparatus which can be energized from a source of low magnitude power such as, for example, an electric motor driven directly from a solar battery. It is, in fact, a feature of the invention that use is made of an electric motor driven directly by a transducer element such as a solar battery.

With regard to the operation of switches, a feature of the invention is to provide operational forces of substantial magnitude and short duration, so that a switch may be effectively operated regardless of the magnitude of energy which controls its operation. Accordingly, as a feature of the invention there may be provided a special cam arrangement, as will be described below.

The invention is, furthermore, particularly concerned with cyclical types of operation such as, for example, the operation of a switch when the sun sets and rises over a period of days. To this end, the invention contemplates a switch control adapted for a sequentially repeated operation and wherein the operating of the control primes the same for the next opertaion. Thus, a feature of the invention, as will be shown, is the storing of a portion of the energy supplied to a switch actuating mechanism, the stored enrgy being employed subsequently to prime the actuating mechanism for the next sequential operation.

Other objects and features of the invention will become apparent from the following detailed description as illustrated by the accompanying drawing, in which:

FIG. 1 illustrates in perspective view, partially exploded, a mechanism provided in accordance with one embodiment of the invention;

FIG. 2 illustrates in side elevational view a detail of the structure of FIG. 1; and FIGS. 3–7 illustrate in time sequence and top elevational view the structure of FIG. 2 during an operation performed by the apparatus of FIG. 1.

The device illustrated in FIG. 1 is a mechanism which is responsive to radiated energy and which performs, in response to the receiving of radiated energy, the function of controlling a switch to which is connected an associated electrical circuit which may perform one of a very large number of conventional functions, which are known per se. The mechanism will be hereinafter described by reference to its separate logical components, but it will be understood that various of the components may be combined with one another or that certain of the components may be omitted or replaced by analogous components which are capable of effecting the same or analogous functions.

Generally, the apparatus shown in FIG. 1 comprises power means 10 which is responsive to radiated energy for generating electrical power of low magnitude; means 12, which is connected directly to means 10 and which serves the purpos of converting the afore-noted electrical power directly into mechanical power, the resulting mechanical power also being normally of low magnitude; means 14 which is coupled to means 12 and which serves the purpose of ampliflying the mechanical power provided by the means 12; cam and lever mechanism 16 which amplifies the power transferred from the gear train 14 and operates a switch 18 which is a switch which works rapidly such as, for example, a microswitch having a snap action. Additionally, there may be provided a means 20 which is in effect a storage device and the function of which is to store a portion of the energy supplied to or amplified by means 14, in order to provide for the operation of means 16 when means 12 is inoperative to supply mechanical power.

Component or means 10 is a device which is responsive to radiated energy for generating electrical power. Normally, this electrical power will be of low magnitude and is generated in response to radiated energy in the form of light such as, for example, sunlight or, in the alternative, infra-red, X-ray, thermal and other types of radiation.

In the preferred embodiment of the invention, which is a light responsive switch control, the means 10 is a solar battery of the selinium or silicon type, and is of known construction and commercially available. Such a battery may consist of, for example, four cells, although two to six cells have been successfully employed and, actually, any number of cells may be employed as desired. In a preferred arrangement, the cells are connected in series and, on a sunny day, each cell will generate .4 volt at .2 milliamp. On a cloudy day, each element will produce about .2 volt at about .1 milliamp.

The component 10 thus responds to radiated energy to generate electrical power of low magnitudes, and component 10 is connected directly by means of lines 22 and 24 to means 12, so that means 12 must perform its function of converting electrical power into mechanical power even though the electrical power is of extremely low magnitudes.

In its preferred form, component 12 is an electrical motor, and it has now been found that the direct current motor illustrated and described in Ishikawa Patent No. 2,779,882 (January 29, 1957) is susceptible of being provided with parameters capable of adapting this motor for operation in conjunction with a source of electrical power as indicated above.

More particularly, the motor illustrated in the Ishikawa patent, if provided, for example, with 2000 turns per coil of .038 millimeter bare diameter copper wire and with magnets made of Alnico 5 magnetic material, is adapted for being operated directly by a solar battery of the type indicated above. In fact, such a motor will have a starting voltage of from .1 to .15 volt at .08 milliamp with no load, and the load which will be hereinafter described as coupled to component 12 requires only a 5–10% additional electrical power supply to component 12 to permit operation thereof. It is to be additionally noted that, with the motor parameters indicated above, the Ishikawa motor will provide for rotating an output shaft at 80 revolutions per minute, with an input to the motor of .4 volt.

With more particular reference to FIG. 1, it will be noted generally that component 12 is illustrated in the form of a direct-current motor, having input terminals 26 and 28 and an output shaft 30 to which is coupled a rod or arm 32.

Rod 32 constitutes a part of a coupling mechanism 34 which detachably couples components 12 and 14. Not only does this detachable coupling facilitate assembly, but it also readily permits a reversal in the direction of rotation of shaft 36, which is coupled by means of bent arm 38 and rod 32 to shaft 30 for power transfer.

Means or component 14 consists, in the preferred embodiment, of a gear train comprising, by way of example, gears 40, 42, 44 and 46. It will be appreciated that a large range of gear ratios may be employed within the scope of the invention, or that other mechanical amplification means can be employed such as, for example, lever systems. In the preferred embodiment of the invention, however, the component 14 is, as indicated above, a gear train, and this gear train is a reduction member having a reduction ratio of, for example, 150 to 1. This reduction ratio permits an accompanying and proportional increase in power from that provided by motor 12 at output shaft 30 to output shaft 48 connected to the output gear of component 14.

The purpose of means or component 16, as noted above, is to amplify further the output power provided by amplifier means 14 and to give the power to operate switch means 18. Although various types of components or mechanical devices will suffice to perform this function, the illustrated cam arrangement constitutes a feature of the invention and, hence, will be described in greater detail hereinafter. It is sufficient to note at this time that the motor 12 operates through amplifier 14 to rotate component 16 in one determinable direction of rotation, and that this rotation amplifiers the power pushing a control or lever 50, which operates switch means 18.

Component 20 preferably consists of a spiral spring 52 connected at one end to shaft 48 and at its other end to a lug 54 fixedly supported on a fixed support member 56. Rotation of shaft 48 in counter-clockwise direction, as illustrated in FIG. 1, tends to wind the spring 52, which therefore operates to store a portion of the power supplied by motor 12. The purpose of the stored power is to drive component 16 in a direction which is opposite to the direction normally caused by operation of the motor 12. In this regard, it must be noted that, while the spring 52 is of sufficiently strong material as to be able to overcome the frictional forces resisting rotation of component 16 in clockwise direction, in FIG. 1, the strength of spring 52, even when fully wound, is insufficient to overcome the rotational force of motor 12 even on a cloudy day. In other words, the operation of components 10 and 12 overrides the operation of component 20, which is, therefore, not effective to rotate component 16 until the motor 12 is inactive.

Component 16, which is rotatable on shaft 48, is shown in side elevational view in FIG. 2. Component 16 includes two axially displaced steps or sections 58 and 60, which may be considered as being cams or cam sections. Each cam section is provided with a peripheral edge 62 or 64, respectively, and with an upper face 66 or 68 respectively. The peripheral edges 62 and 64 cooperate with the lever 50 to displace the same. Lever 50 includes an end pivotally connected with switch means 18 by pivot 70 and a free end 72 which is in the form of a ramp or inclined portion for purposes of cooperating with a guide, as will hereinafter be indicated in greater detail. It is to be noted that the free end 72 of the lever 50 has a normal plane of repose, which may be either due to the configuration of lever 50 or due to the urging of the same against a plate 74. In any event, free end 72 normally seeks a position at which it engages peripheral edge 64 and when displaced upwardly, in a manner which will be indicated hereinafter, away from said plane, free end 72 always seeks to return to the plane of repose, as indicated in FIG. 1.

In FIG. 1 are further illustrated two stops 76 and 78, fixedly mounted on the plate 74. Also indicated on cam section 60 is a guide member 80, which is fixed to cam section 60 and movable therewith. Although guide member 80 is shown in the form of a separate pin, it is obvious that this guide member can be integrally fabricated with cam section 60.

FIGS. 3–7 illustrate the operational sequence of the various elements of component 16. In FIG. 3, cams 58 and 60, which are rigidly fixed to one another, are shown in the position to which they are driven by the operation of spring 52. This position is limited by engagement of guide member 80 with stop 78 and is the position which cams 58 and 60 will assume when no light or less than a threshold level of light is received by component 10 and, therefore, motor 12 is inactive. In this position, lever 50 is spaced from shaft 48 (which constitutes a reference point) by a distance D1, which distance must, in accordance with the construction and relative positioning of switch means 18, be increased by a minimum amount $x$ to operate the switch. Switch 18, for purposes of explanation, is an off-on switch which is actuated by the application of sequential forces in opposite direction.

It is assumed that the switch is closed with the cams in the position illustrated in FIG. 3, thus closing an associated electrical circuit including lines 82 and 84.

By reason of the curvature of peripheral edge 64, a movement of cams 58 and 60 in the direction of arrow 86 will tend to urge lever 50 pivotally away from shaft 48, so as to increase the distance between these elements by an amount at least equal to $x$.

Such a movement is indicated in FIG. 4, wherein the portion 88 of peripheral edge 64 has urged lever 50 away from shaft 48, such that the distance therebetween is that indicated at D2. D2 represents an arbitrarily selected distance which exceeds the sum of D1 and $x$. The switch conventionally opens with a snap action with the lever moved through the distance D2.

In FIG. 5, the cams continue to turn in the direction of arrow 86. Guide member 80 engages beneath ramp 72 (as shown in chain lines) and elevates the free end of lever 50 to the level of face 68. Lever 50 not only seeks to maintain a position against plate 74, but also resiliently resists the displacement illustrated in FIGS. 3 and 4, by virtue of its own resiliency or by virtue of the resiliency of the pivotal connection at pivot 70. Therefore, when elevated by guide 80, lever 50 springs against peripheral edge 62 of cam 58 and assumes the position indicated by solid lines. In the position indicated in FIG. 5, lever 50 is separated from shaft 48 by distance D3.

With light shining on component 10, motor 12 continues to rotate cams 58 and 60 in the direction of arrow 86, until guide 80 comes into contact with stop 76. Motor 12 thereafter continues to urge guide 80 against stop 76, while at the same time overcoming the opposing force of spring 52 which has been wound to its maximum amount. This condition persists until the sun sets, or the source of light otherwise interrupted, whereupon the motor 12 ceases to be active and the function of rotating shaft 48 is taken over by the spring 52.

Then, as illustrated in FIG. 6, cams 58 and 60 rotate in the direction of arrow 90, and lever 50 commences to pivot back to the starting position illustrated in FIG. 1 by riding along the peripheral edge 62. During this operation, distance D4 assumes a magnitude whereby lever 50 functions to close switch 18 and, therefore, the associated circuit including lines 82 and 84. The distance between edges 62 and 64 accounts for the "differential travel" of the switch; i.e. it accounts for the fact that the switch conventionally opens and closes at different positions of lever 50.

As illustrated in FIG. 7, when guide member 80 approaches stop 78, lever 50 is engaged with a portion of peripheral edge 62, which corresponds directly with an aligned portion of peripheral edge 64. The tendency of lever 50 to urge itself axially along shaft 48 towards plate 74 (into the plane of the drawing as illustrated in FIG. 7) enables lever 50 to move downwardly into engagement with peripheral edge 64, from which the operation starts all over again when the component 10 is next exposed to light. In the interim (the dark period) spring 52 maintains guide 80 against stop 78, with the switch 18 in closed condition as is desired.

There will now be obvious to those skilled in the art many modifications and variations of the structure set forth. These modifications and variations will not, however, depart from the scope of the invention, as defined in the following claims.

What is claimed is:

1. A switch control operable by low magnitudes of power and providing a strong rapid thrust for actuating the switch; said control comprising a resilient lever having a pivoted end and a free end, the free end being resiliently displaceable from a reference plane, said lever being operatively associated with said switch and being pivotable between two spaced positions for the control of said switch, a shaft perpendicular to said plane, and a cam rotatable on said shaft and having faces parallel to said plane, said cam including axially displaced sections each having a peripheral edge for selectively engaging said lever, one edge intersecting said plane and having in part radii substantially exceeding those of the other edge, and means on the cam to displace said free end for engagement by said other edge whereby the lever moves between said edges, said edges being aligned with said positions.

2. A motor driven switch adapted for use with a solar battery comprising a rotatable cam, spaced stops adjacent said cam, a guide member on said cam and adapted to engage said stops, means for rotating said cam selectively in opposite directions to move said guide member between said stops which thereby operate to limit rotation of said cam, and a lever engaging said cam for operating said switch, said lever having two spaced actuation positions at which said switch is controlled, said cam including relatively displaced sections having effective cam edges each associated with one of said actuation positions, said guide member being in a position on said cam to displace said lever from one of said cam edges to the other whereby one cam edge controls said lever at one of said actuation positions and the other cam edge controls said lever at the other actuation position.

3. A motor driven switch adapted for use with a solar battery comprising a rotatable cam, a guide member on said cam, means for rotating said cam and a lever engaging said cam for operating said switch, said lever having two spaced actuation positions at which said switch is controlled, said cam including relatively displaced sections having effective cam edges each associated with one of said actuation positions, said guide member being in a position on said cam to displace said lever from one of said cam edges to the other whereby one cam edge controls said lever at one of said actuation positions and the other cam edge controls said lever at the other actuation position.

4. A motor driven switch adapted for use with a solar battery comprising a rotatable cam, a guide member on said cam, means for rotating said cam and a lever engaging said cam for operating said switch, said lever having two spaced actuation positions at which said switch is controlled, said cam including relatively displaced sections having effective cam edges each associated with one of said actuation positions, said guide member being in a position on said cam to displace said lever, upon rotation of said cam, from one of said cam edges to the other whereby said one cam edge controls said lever at one of said actuation positions and said other cam edge controls said lever at the other actuation position, said lever being resiliently urged toward a position of engagement with said one cam edge, said cam edges including aligned portions whereat said lever can return to engagement with said one cam edge.

5. A motor driven switch adapted for use with a solar battery comprising a rotatable cam, spaced stops adjacent said cam, a guide member on said cam and adapted to engage said stops, means for rotating said cam selectively in opposite directions to move said guide member between said stops which thereby operate to limit rotation of said cam, and a lever engaging said cam for operating said switch, said lever having two spaced actuation positions at which said switch is controlled, said cam including relatively displaced sections having effective cam edges each associated with one of said actuation positions, said guide member being in a position on said cam to displace said lever from one of said cam edges to the other whereby one cam edge controls said lever at one of said actuation positions and the other cam edge controls said lever at the other actuation position; said means for rotating said cam comprising a gear train coupled to and rotating said cam in one direction and a spring coupled to said gear train and cam and adapted to be loaded by said gear train to rotate the cam in the opposite direction.

6. A motor driven switch adapted for use with a solar battery comprising a rotatable cam, a guide member on said cam, means for rotating said cam and switch operating means engaging said cam for operating said switch, said switch operating means having two spaced actuation positions at which said switch is controlled, said cam including relatively displaced sections having effective cam edges each associated with one of said actuation positions, said guide member being in a position on said cam to displace said switch operating means from one of said cam edges to the other whereby one cam edge controls said switch operating means at one of said actuation positions and the other cam edge controls said switch operating means at the other actuation position.

7. A switch control adapted for use with a solar battery comprising a rotatable cam, means for rotating said cam, switch operating means engaging said cam for operating said switch, said switch operating means having two spaced actuation positions at which said switch is controlled, said cam including relatively displaced sections each associated with one of said actuation positions, and means on the cam effective on rotation of said cam to displace said switch operating means from one of said cam sections to the other whereby one cam section controls said switch operating means at one of said actuation positions and the other cam section controls said switch operating means at the other actuation position.

References Cited in the file of this patent

UNITED STATES PATENTS

| | | |
|---|---|---|
| 1,413,075 | Van Slyke | Apr. 18, 1922 |
| 1,495,112 | Sauter | May 20, 1924 |
| 2,780,765 | Chapin et al. | Feb. 5, 1957 |
| 2,792,468 | Kozikowski | May 14, 1957 |
| 2,975,335 | Harris | Mar. 14, 1961 |